US009412355B2

(12) United States Patent
Kim et al.

(10) Patent No.: US 9,412,355 B2
(45) Date of Patent: Aug. 9, 2016

(54) SOUND-ABSORBING MATERIAL AND METHOD FOR PREPARING THE SAME (71) Applicants: Hyundai Motor Company, Seoul (KR); Kia Motors Corporation, Seoul (KR)

(72) Inventors: Keun Yong Kim, Gyeonggi-Do (KR); Won Jin Seo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/409,972

(22) PCT Filed: Jun. 19, 2013

(86) PCT No.: PCT/KR2013/005424
§ 371 (c)(1),
(2) Date: Apr. 27, 2015

(87) PCT Pub. No.: WO2013/191474
PCT Pub. Date: Dec. 27, 2013

(65) Prior Publication Data
US 2015/0259904 A1      Sep. 17, 2015

(30) Foreign Application Priority Data
Jun. 20, 2012  (KR) .................. 10-2012-0066309

(51) Int. Cl.
*E04B 1/86* (2006.01)
*G10K 11/162* (2006.01)
(Continued)

(52) U.S. Cl.
CPC ............... *G10K 11/162* (2013.01); *B32B 5/26* (2013.01); *B32B 5/28* (2013.01); *B32B 7/02* (2013.01);
(Continued)

(58) Field of Classification Search
CPC ........................................................ E04B 1/86
USPC ............................................ 181/294, 286, 284
See application file for complete search history.

(56) References Cited

U.S. PATENT DOCUMENTS

| 4,696,764 A | 9/1987 | Yamazaki |
| 6,322,658 B1 | 11/2001 | Byma et al. |

(Continued)

FOREIGN PATENT DOCUMENTS

| CN | 1037386 A | 11/1989 |
| CN | 1817691 A | 8/2006 |

(Continued)

OTHER PUBLICATIONS

International Preliminary Report on Patentability / Written Opinion of the International Searching Authority in corresponding International Application No. PCT/KR2013/005424, mailed Oct. 15, 2013—English Translation included.

(Continued)

*Primary Examiner* — Forrest M Phillips
(74) *Attorney, Agent, or Firm* — Mintz Levin Cohn Ferris Glovsky and Popeo, P.C.; Peter F. Corless (57) ABSTRACT The present invention relates to a sound-absorbing material and a method for preparing same. More particularly, it relates to a sound-absorbing material prepared by impregnating a binder into a nonwoven fabric formed of a heat-resistant fiber, having superior sound-absorbing property, flame retardancy, heat resistance and heat-insulating property, thus being applicable to parts maintained at high temperatures of 200° C. or above, to say nothing of room temperature, and being shape-able owing to the binder, and a method for preparing same.

32 Claims, 5 Drawing Sheets (51) Int. Cl.
| | |
|---|---|
| *B32B 5/26* | (2006.01) |
| *B32B 5/28* | (2006.01) |
| *B32B 7/02* | (2006.01) |
| *B32B 38/00* | (2006.01) |
| *B60R 13/08* | (2006.01) |
| *C09D 163/00* | (2006.01) |
| *D04H 1/4242* | (2012.01) |
| *D04H 1/4326* | (2012.01) |
| *D04H 1/46* | (2012.01) |
| *D04H 1/587* | (2012.01) |
| *D06M 15/55* | (2006.01) |
| *E04B 1/84* | (2006.01) |

(52) U.S. Cl.
CPC ............... *B32B 38/00* (2013.01); *B60R 13/08* (2013.01); *B60R 13/0815* (2013.01); *C09D 163/00* (2013.01); *D04H 1/4242* (2013.01); *D04H 1/4326* (2013.01); *D04H 1/46* (2013.01); *D04H 1/587* (2013.01); *D06M 15/55* (2013.01); *E04B 1/84* (2013.01)

(56) References Cited

U.S. PATENT DOCUMENTS

| | | | |
|---|---|---|---|
| 2008/0121461 A1* | 5/2008 | Gross et al. .................. 181/286 |
| 2010/0032234 A1 | 2/2010 | Niwa et al. | |
| 2010/0229517 A1 | 9/2010 | Fujihara | |

FOREIGN PATENT DOCUMENTS

| | | |
|---|---|---|
| CN | 1842698 A | 10/2006 |
| CN | 101153428 A | 4/2008 |
| EP | 0189189 A2 | 7/1986 |
| EP | 1022375 A1 | 7/2000 |
| EP | 1262586 A1 | 12/2002 |
| JP | 2002-004164 A | 1/2002 |
| JP | 2005-335279 A | 12/2005 |
| JP | 2006-138935 A | 6/2006 |
| JP | 2007-039826 A | 2/2007 |
| JP | 4054826 B2 | 3/2008 |
| JP | 2010-059964 A | 3/2010 |
| KR | 10-2006-0111330 A | 10/2006 |
| KR | 10-1114805 | 3/2007 |
| WO | 2005-019783 A1 | 3/2005 |
| WO | 2009054349 A1 | 4/2009 |

OTHER PUBLICATIONS

Notification Concerning Transmittal of International Preliminary Report on Patentability (Chapter I of the Patent Cooperation Treaty) in corresponding International Application No. PCT/KR2013/005424, mailed Dec. 31, 2014.

Notification of Transmittal of Translation of the International Preliminary Report on Patentability (Chapter I or Chapter II) in corresponding International Application No. PCT/KR2013/005424, mailed Dec. 31, 2014.

* cited by examiner

Applied part (b)

SOUND-ABSORBING MATERIAL AND METHOD FOR PREPARING THE SAME

CROSS REFERENCE TO RELATED APPLICATION

The present application claims priority to International Patent Application No. PCT/KR2013/005424 filed Jun. 19, 2013, which also claims priority to Korean Patent Application No 10-2012-0066309, filed Jun. 20, 2012, the entire contents of both applications are incorporated herein for all purposes by this reference.

TECHNICAL FIELD

The present invention relates to a sound-absorbing material and a method for preparing same. More particularly, it relates to a sound-absorbing material prepared by impregnating a binder into a nonwoven fabric formed of a heat-resistant fiber, having superior sound-absorbing property, flame retardancy, heat resistance and heat-insulating property, thus being applicable to parts maintained at high temperatures of 200° C. or above, to say nothing of room temperature, and being shapeable (moldable) owing to the binder, and a method for preparing the same.

BACKGROUND ART

Noise, as an unwanted side effect of industrial development, causes gradually more damages. A variety of measures are taken to prevent noise. In an effort to prevent the noise, research on the development of new sound-absorbing materials capable of arresting, absorbing or insulating sound has been conducted in various ways.

Representative industrial sectors requiring sound-absorbing materials include electric appliances such as air conditioner, refrigerator, washing machine, lawn mower, etc., transportation such as automobile, ship, airplane, etc., construction materials such as wall material, flooring material, etc., and so forth. The sound-absorbing material is required in other various industrial fields, too. In general, the sound-absorbing materials used in industries require, in addition to good sound-absorbing property, lightweightness, flame retardancy, heat resistance and heat-insulating property, depending on particular applications. Especially, flame retardancy and heat resistance may be further required for sound-absorbing materials used in engines, exhaust systems, etc. maintained at high temperatures of 200° C. or above. At present, aramid fibers are gaining attentions for sound-absorbing materials having superior heat resistance.

In addition, in order to provide functionalities such as flame retardancy, water repellency, etc. to a sound-absorbing material, many sound-absorbing materials wherein a nonwoven fabric containing aramid fibers and a functional skin material are laminated on each other have been developed.

For example, Korean Patent Application Publication No. 2007-0033310 discloses a flame-retardant sound-absorbing material wherein a nonwoven fabric layer in which a heat-resistant short aramid fibers and short thermoplastic polyester fibers are bridged and a skin material layer formed of a wet-laid nonwoven fabric consisting of short aramid fibers are laminated with each other.

Japanese Patent Application Publication No. 2007-0039826 discloses a water-repellent sound-absorbing material wherein a nonwoven fabric layer of a heat-resistant short aramid fiber or a blend of a short aramid fiber and a short thermoplastic polyester fiber and a skin material layer treated with a water repellent are laminated with each other.

Japanese Patent Application Publication No. 2007-0138953 discloses a heat-resistant sound-absorbing material wherein a nonwoven fabric layer consisting of a heat resistance aramid fiber and a skin material layer formed of a fiber sheet containing a heat resistance aramid fiber are laminated with each other.

Since the sound-absorbing materials described above have a structure wherein a skin material layer is laminated on one side of a nonwoven fabric to provide functionalities such as flame retardancy, water repellency, etc., a hot pressing process for integrating the nonwoven fabric layer and the skin material layer is necessary. Consequently, the overall process is complicated and troublesome and a flame retardant, water repellent, etc. included as additives may lead to production of toxic gases as a result of combustion during the hot pressing process. In addition, deformation of the internal structure of the nonwoven fabric that may occur during the hot pressing process can lead to deterioration of sound-absorbing property.

DISCLOSURE

Technical Problem

In order solve the above-described problem of the existing art, the inventors of the present invention have conducted extensive research on developing a new sound-absorbing material having superior sound-absorbing property, flame retardancy, heat resistance and heat-insulating property and being shapeable. As a result, they succeeded in developing a new sound-absorbing material, wherein a binder is impregnated into a nonwoven fabric having irregular vent holes with a complicated three-dimensional labyrinth structure and is cured while maintaining the three-dimensional structure inside the nonwoven fabric without blocking the vent holes, thereby improving the physical properties of the nonwoven fabric including sound-absorbing property and allowing shaping into a desired shape during the curing of the binder.

Accordingly, the present invention is directed to providing a sound-absorbing material having superior sound-absorbing property, flame retardancy, heat resistance and heat-insulating property and being shapeable (moldable) into a desired shape during curing of a binder impregnated into a nonwoven fabric formed of a heat-resistant fiber.

The present invention is also directed to providing a method for preparing a sound-absorbing material by impregnating a binder into a nonwoven fabric formed of a heat-resistant fiber and drying same.

The present invention is also directed to providing a method for reducing noise by using the sound-absorbing material in a noise-generating device.

Technical Solution

In an aspect, the present invention provides a sound-absorbing material including: a nonwoven fabric containing 30-100 wt % of a heat-resistant fiber; and a binder present in the same layer as the nonwoven fabric and maintaining a three-dimensional structure inside the nonwoven fabric.

In another aspect, the present invention provides a method for preparing a sound-absorbing material, including: a) immersing a nonwoven fabric containing 30-100 wt % of a heat-resistant fiber in a binder solution; and b) drying the nonwoven fabric.

In another aspect, the present invention provides a method for reducing noise of a noise-generating device, including: i) checking the three-dimensional shape of a noise-generating device; ii) preparing and shaping a sound-absorbing material so as to correspond to the three-dimensional shape of the device partially or wholly; and iii) bringing the sound-absorbing material adjacent to the noise-generating device.

Advantageous Effects

A sound-absorbing material of the present invention, wherein a binder is impregnated into a nonwoven fabric formed of a heat-resistant fiber, is advantageous in that the sound-absorbing material has superior sound-absorbing property, flame retardancy, heat resistance and heat-insulating property and it can be shaped into a three-dimensional shape owing to the binder.

Also, the sound-absorbing material of the present invention is advantageous in that a hot pressing process for integrating a nonwoven fabric with a skin material is not necessary unlike the existing sound-absorbing material having a laminated structure.

Further, the sound-absorbing material of the present invention is advantageous in that, if the sound-absorbing material is prepared by further including a functional additive in a binder solution, desired functionality maybe provided to the sound-absorbing material without laminating a skin material.

The sound-absorbing material of the present invention is also advantageous in that, since flame retardancy, heat resistance and heat-insulating property are superior in addition to sound-absorbing properties, the sound-absorbing material is not deformed or denatured even when used in a noise-generating device maintained at high temperatures of 200° C. or above.

Further, the sound-absorbing material of the present invention is advantageous in that, if a thermosetting resin is used as a binder, shaping into a desired shape is possible during the curing of the thermosetting resin. That is to say, the overall process can be simplified since the curing and shaping of the thermosetting resin are achieved simultaneously.

In addition, the sound-absorbing material of the present invention is advantageous in that, since a nonwoven fabric formed of a heat-resistant fiber is used, thermal deformation of the nonwoven fabric due to the reaction heat of thermal curing does not occur even when a thermosetting resin is used as a binder.

Accordingly, the sound-absorbing material of the present invention is useful as a sound-absorbing material in the applications requiring arresting, absorbing or insulating of sound, including electric appliances such as air conditioner, refrigerator, washing machine, lawn mower, etc., transportation such as automobile, ship, airplane, etc., construction materials such as wall material, flooring material, etc., and so forth. The sound-absorbing material of the present invention is useful as a sound-absorbing material for a noise-generating device maintained at high temperatures of 200° C. or above. In particular, when the sound-absorbing material of the present invention is used in an automobile, it may be closely attached to a noise-generating device of the automobile such as engine, exhaust system, etc., provided with a distance from the noise-generating device, or shaped as a part of the noise-generating device.

BEST MODE FOR CARRYING OUT INVENTION

The present invention relates to a sound-absorbing material and a method for preparing same. The sound-absorbing material of the present invention has superior sound-absorbing property, flame retardancy, heat resistance and heat-insulating property is shapeable (moldable) into a desired three-dimensional shape because a binder is present in the same layer as a heat-resistant fiber nonwoven fabric.

In an aspect, the present invention provides a sound-absorbing material including: a nonwoven fabric containing 30-100 wt % of a heat-resistant fiber; and a binder present in the same layer as the nonwoven fabric and maintaining a three-dimensional structure inside the nonwoven fabric.

In an exemplary embodiment of the present invention, the heat-resistant fiber has a limiting oxygen index (LOI) of 25% or greater and a heat resistance temperature of 200° C. or higher.

In an exemplary embodiment of the present invention, the heat-resistant fiber is one or more selected from a group consisting of aramid fiber, polyphenylene sulfide (PPS) fiber, oxidized polyacrylonitrile (oxi-PAN) fiber, polyimide (PI) fiber, polybenzimidazole (PBI) fiber, polybenzoxazole (PBO) fiber, polytetrafluoroethylene (PTFE) fiber, polyketone (PK) fiber, metallic fiber, carbon fiber, glass fiber, basalt fiber, silica fiber and ceramic fiber.

More specifically, the heat-resistant fiber may be an aramid fiber.

In an exemplary embodiment of the present invention, the nonwoven fabric is a single-layer nonwoven fabric formed of an aramid fiber of 1-15 denier and having a thickness of 3-20 mm.

In an exemplary embodiment of the present invention, the nonwoven fabric has a density of 100-2000 g/m$^2$.

More specifically, the nonwoven fabric may have a density of 200-1200 g/m$^2$.

In an exemplary embodiment of the present invention, the binder is a thermosetting resin.

More specifically, the thermosetting resin may be an epoxy resin which is capable of forming a three-dimensional network structure in the internal structure of the nonwoven fabric.

More specifically, the epoxy resin may be one or more epoxy resin selected from bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, bisphenol A diglycidyl ether polymer, phosphazene diglycidyl ether, bisphenol A novolac epoxy, phenol novolac epoxy resin and o-cresol novolac epoxy resin.

The structure of the sound-absorbing material according to the present invention will be described in more detail referring to FIG. 1.

Figure 1:
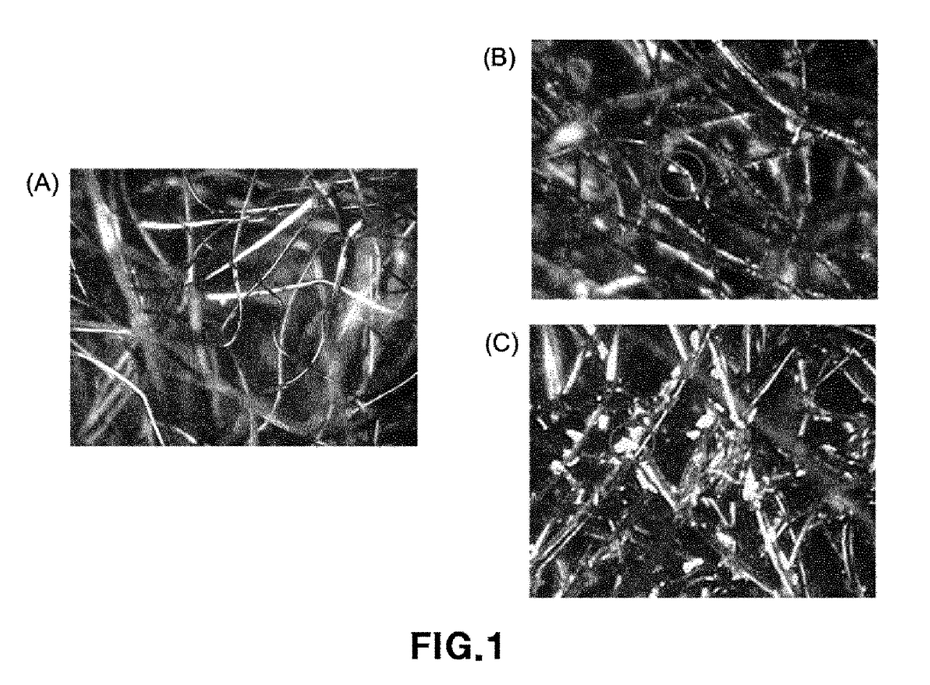
FIG. 1 shows electron microscopic images (×300) of a nonwoven fabric before and after impregnation of a binder. (A) is an image of a nonwoven fabric before impregnation of a binder, (B) is an image of a nonwoven fabric in which 20 parts by weight of a binder has been impregnated based on 100 parts by weight of the nonwoven fabric, and (C) is an image of a nonwoven fabric in which 50 parts by weight of a binder has been impregnated based on 100 parts by weight of the nonwoven fabric.

FIG. 1 shows electron microscopic images showing the three-dimensional structure inside a nonwoven fabric before and after impregnation of a binder.

FIG. 1 (A) is an electron microscopic image showing the internal structure of a nonwoven fabric before impregnation of a binder. It can be seen that heat-resistant fiber yarns cross each other to form irregular vent holes. FIGS. 1 (B) and (C) are electron microscopic images after impregnation of a binder into the nonwoven fabric. It can be seen that the binder is finely and uniformly distributed and attached to the heat-resistant fiber yarns. Also, it can be seen that the content of the binder on the yarn surface increases as the content of the binder increases.

Although there may be differences depending on the preparation method, fibers are randomly arranged in a nonwoven fabric three-dimensionally. Accordingly, the pore structure inside a nonwoven fabric tends to have a very complicated labyrinth structure wherein regularly or irregularly arranged fibers are three-dimensionally interconnected rather than bundles of independent capillary tubes. That is to say, the nonwoven fabric used in the present invention has irregular vent holes formed as the yarns containing the heat-resistant fiber loosely cross each other.

If a binder is impregnated into the nonwoven fabric, the binder is finely and uniformly distributed and attached to the surface of the nonwoven fabric yarns containing the heat-resistant fiber, thereby forming much finer vent holes than before the impregnation. The formation of fine vent holes in the internal structure of the nonwoven fabric means increased resonance of noise and thus improved sound-absorbing property. If the binder forms a three-dimensional network structure as it is cured, the sound-absorbing property can be further improved since finer vent holes can be formed inside the nonwoven fabric.

Accordingly, since the nonwoven fabric can maintain the intrinsic three-dimensional shape as the binder is uniformly impregnated into the nonwoven fabric and, additionally, since more fine vent holes can be formed as the binder is cured, the sound-absorbing material of the present invention has remarkably improved sound-absorbing performance owing to the maximized noise absorption through increased resonance in the nonwoven fabric.

As seen from the electron microscopic images of FIG. 1, in the sound-absorbing material of the present invention, the binder is uniformly dispersed and distributed on the surface of the heat-resistant fiber yarns constituting the nonwoven fabric.

Hereinafter, the constituents of the sound-absorbing material according to the present invention having the internal structure described above will be described in more detail.

In the present invention, a heat-resistant fiber is used as the main fiber constituting the nonwoven fabric.

The heat-resistant fiber may be any one having superior durability and capable of enduring high-temperature and ultrahigh-temperature conditions. Specifically, the heat-resistant fiber may be one having a limiting oxygen index (LOI) of 25% or greater and a heat resistance temperature of 150° C. or higher. More specifically, the heat-resistant fiber may be one having a limiting oxygen index (LOI) of 25-80% and a heat resistance temperature of 150-3000° C. Most specifically, the heat-resistant fiber may be one having a limiting oxygen index (LOI) of 25-70% and a heat resistance temperature of 200-1000° C. And, the heat-resistant fiber may have a fineness of 1-15 denier, specifically 1-6 denier and a yarn length of 20-100 mm, specifically 40-80 mm.

The heat-resistant fiber may be 'super fiber' as commonly called in the related art. Specifically, the super fiber may be one or more selected from aramid fiber, polyphenylene sulfide (PPS) fiber, oxidized polyacrylonitrile (oxi-PAN) fiber, polyimide (PI) fiber, polybenzimidazole (PBI) fiber, polybenzoxazole (PBO) fiber, polytetrafluoroethylene (PTFE) fiber, polyketone (PK) fiber, metallic fiber, carbon fiber, glass fiber, basalt fiber, silica fiber, ceramic fiber, etc.

Specifically, an aramid fiber may be used as the heat-resistant fiber in the present invention. More specifically, meta-aramid (m-aramid), para-aramid (p-aramid) or a mixture thereof may be used as the heat-resistant fiber in the present invention. The aramid fiber used as the yarn of the nonwoven fabric in the present invention may have a fineness of 1-15 denier, specifically 1-6 denier, and a yarn length of 20-100 mm, specifically 40-80 mm. When the yarn length is too short, bridging of yarns may be difficult during needle punching. As a result, cohesion of the nonwoven fabric may be weak. In contrast, when the yarn length is too long, cohesion of the nonwoven fabric may be superior but movement of yarns may be difficult during carding.

The aramid fiber is an aromatic polyamide fiber wherein aromatic rings such as benzene ring are bonded with each other by amide groups. To distinguish from an aliphatic polyamide (e.g., nylon), the aromatic polyamide fiber is called 'aramid'. The aramid fiber is prepared by spinning of aromatic polyamide and is classified into aromatic ring m-aramid and p-aramid depending on the location of the amid bonds.

[Chemical Formula 1]

[Chemical Formula 2]

The m-aramid represented by Chemical Formula 1 is prepared by dry spinning after dissolving isophthaloyl chloride and m-phenylenediamine in a dimethylacetamide (DMAc) solvent. The m-aramid has a relatively high elongation at break of 22-40% due to the uneven polymer structure, is dyeable and can be easily prepared into fibers. The m-aramid is commercially available under the trade names Nomex™ (DuPont) and Conex™ (Teijin).

The p-aramid represented by Chemical Formula 2 is prepared by wet spinning after dissolving terephthaloyl chloride and p-phenylenediamine in an N-methylpyrrolidone (NMP) solvent. The p-aramid has high strength due to its highly oriented linear molecular structure. Being stronger than m-aramid by about 3-7 folds, it is used for reinforcement or protection materials. Also, the p-aramid exhibits strong chemical resistance, less thermal shrinkage, superior dimensional stability, high tensile strength, flame resistance and self-extinguishing property. The p-aramid is commercially available under the trade names Kevlar™ (DuPont), Twaron™ (Teijin) and Technora™ (Teijin).

The aramid is provided in the form of filament, staple, yarn, etc. and is used for reinforcing materials (transformer, motor, etc.), insulating materials (insulating paper, insulating tape, etc.), heat-resistant fibers (fireproof clothing, gloves, etc.), high-temperature filters, or the like.

Although the nonwoven fabric used in the sound-absorbing material of the present invention is practically prepared from the heat-resistant fiber yarn, nonwoven fabrics prepared by further adding other fibers to the heat-resistant fiber yarn, to reduce cost or provide lightweightness, functionality, etc. to the nonwoven fabric, may also be included in the scope of the present invention. That is to say, although the nonwoven fabric of the present invention is prepared from the heat-resistant fiber yarn, the present invention is never limited to the nonwoven fabric formed only of the heat-resistant fiber. The nonwoven fabric of the present invention may include the heat-resistant fiber yarn in an amount of 30-100 wt %, more specifically 60-100 wt %, based on the weight of the nonwoven fabric.

Further, the sound-absorbing material of the present invention includes a binder present in the same layer as the nonwoven fabric and maintaining the three-dimensional structure inside the nonwoven fabric. The binder used in the present invention may be any one capable of maintaining the three-dimensional structure inside the nonwoven fabric. The expression 'maintaining the three-dimensional structure inside the nonwoven fabric' means that the binder, which has been impregnated into the nonwoven fabric, is uniformly distributed and attached to the surface of the fiber yarn of the nonwoven fabric and maintains the structure of or facilitates the formation of irregular vent holes, thereby maintaining the original three-dimensional structure inside the nonwoven fabric.

Although a binder generally refers to a material used to adhere or join two materials, the term binder used in the present invention refers to a material impregnated into the nonwoven fabric formed of the heat-resistant fiber.

Many materials can be used as the binder impregnated into the nonwoven fabric. First, a thermoplastic resin or a thermosetting resin may be considered as the binder material.

The thermoplastic resin such as a polyamide-based resin has crystalline polar groups like the aramid fiber as a representative heat-resistant fiber. As such, if a thermoplastic binder is impregnated into the nonwoven fabric formed of the thermoplastic heat-resistant fiber, a strong interfacial layer is formed between them by face-to-face contact between the similar crystalline polar groups, which partially blocks the vent holes of the nonwoven fabric. That is to say, if a thermoplastic resin is used as the binder impregnated into the nonwoven fabric formed of the thermoplastic heat-resistant fiber, sound-absorbing performance is decreased owing to the partial blocking of the vent holes of the nonwoven fabric. At a glimpse, it may be thought that the sound-absorbing performance would be improved if the vent holes are blocked. But, since noise is not eliminated inside the nonwoven fabric but is transmitted via other routes, improvement of sound-absorbing performance cannot be expected if the thermoplastic binder is impregnated. In addition, when the thermoplastic binder is impregnated into a nonwoven fabric formed of the inorganic-based heat-resistant fiber, and adhesive additive has to be further added because of weak binding.

In contrast, a thermosetting binder has totally different physical and chemical properties from the thermoplastic heat-resistant fiber. Accordingly, when a thermosetting binder is impregnated into the nonwoven fabric formed of the thermoplastic heat-resistant fiber, an interfacial layer is formed by edge-to-edge contact because of the difference in characteristics. As a result, the vent holes of the nonwoven fabric remain open. That is to say, when a thermosetting resin is used as the binder impregnated into the nonwoven fabric formed of the heat-resistant fiber, the three-dimensional structure inside the nonwoven fabric can be maintained. Accordingly, a thermosetting resin may be used preferably as the binder in the present invention.

Furthermore, the thermosetting resin has the characteristics that it is curable with light, heat or a curing agent and its shape is not deformed even at high temperatures. Accordingly, by using the heat-resistant fiber and the thermosetting binder with a specific condition, the present invention is advantageous in that the shape of the sound-absorbing material can be maintained even at high temperatures. Therefore, when a thermosetting resin is used as the binder impregnated into the nonwoven fabric, shaping to a desired shape can be achieved during the curing of the resin and the resulting shape can be maintained even at high temperatures.

As described above, when a thermosetting resin is used as the binder impregnated into the nonwoven fabric formed of the heat-resistant fiber, the effects of maintaining the three-dimensional structure inside the nonwoven fabric and shaping to a desired shape during the curing of the binder resin can be expected.

More specifically, an epoxy resin may be used as the binder. The epoxy resin is a kind of a thermosetting resin and is curable into a polymer material having a three-dimensional network structure. Accordingly, since the epoxy resin can form a network structure and thus vent holes when cured inside the nonwoven fabric, more fine vent holes can be formed inside the nonwoven fabric and the sound-absorbing performance can be further improved.

Further, since a more advanced three-dimensional network structure can be formed if the curing is carried out in the presence of a curing agent, the sound-absorbing effect can be further improved. That is to say, a three-dimensional network-structured polymer is formed as the epoxy groups or hydroxy groups of the epoxy resin react with the functional groups of the curing agent such as amine groups or carboxylic acid groups to form covalent crosslinkages. The curing agent not only serves as a catalyst that catalyzes curing reaction but also is directly involved in the reaction and is linked in the molecule of the epoxy resin. Accordingly, the size and physical properties of the vent holes can be controlled by selecting different curing agents.

The epoxy resin may be one or more selected from bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, bisphenol A diglycidyl ether polymer, phosphazene diglycidyl ether, bisphenol A novolac epoxy, phenol novolac epoxy resin, o-cresol novolac epoxy resin, etc. The epoxy resin may be one having an epoxy equivalent of 70-400. When the epoxy equivalent is too low, intermolecular binding may be too weak to form a three-dimensional network structure or the physical properties of the sound-absorbing material may be unsatisfactory because of weak adhesion with the heat-resistant fiber. In contrast, when the epoxy equivalent is too high, the physical properties of the sound-absorbing material may be unsatisfactory because a very dense network structure is formed.

When a thermosetting resin is used as a binder in the present invention, the curing agent may be included in a binder solution. The curing agent may be one having functional groups that can react readily with the functional groups of the binder such as epoxy groups or hydroxy groups. As the curing agent, an aliphatic amine, an aromatic amine, an acid anhydride, urea, an amide, imidazole, etc. may be used. Specifically, the curing agent may be one or more selected from diethyltoluenediamine (DETDA), diaminodiphenylsulfone (DDS), boron trifluoride-monoethylamine ($BF_3$.MEA), diaminocyclohexane (DACH), methyltetrahydrophtalic anhydride (MTHPA), methyl-5-norbornene-2,3-dicarboxylic anhydride (NMA), dicyandiamide (Dicy), 2-ethyl-4-methylimidazole, etc. More specifically, an aliphatic amine- or amide-based curing agent may be used because they have relatively good crosslinking ability and very superior chemical resistance and weather resistance. Most specifically, dicyandiamide (Dicy) may be used in consideration of crosslinking ability, flame retardancy, heat resistance, storage stability, processability, etc. Because dicyandiamide (Dicy) has a high melting point above 200° C., it retains superior storage stability after being mixed with the epoxy resin and can ensure sufficient processing time for curing and shaping.

Further, a catalyst that facilitates the curing of the thermosetting resin used as the binder in the present invention may be used. The catalyst may be one or more selected from urea, dimethylurea, a tetraphenylborate salt of quaternary DBU, quaternary phosphonium bromide, etc. The catalyst may be included in the binder-containing solution.

In addition, various additives, e.g., flame retardant, heat resistance improver, water repellent, etc., may be used to provide functionalities to the sound-absorbing material. The additive is included in the binder solution and no additional skin material for providing functionalities to the sound-absorbing material is necessary.

The flame retardant may be melamine, phosphate, metal hydroxide, etc. Specifically, one or more selected from melamine, melamine cyanurate, melamine polyphosphate, phosphazene, ammonium polyphosphate, etc. may be used as the flame retardant. More specifically, the flame retardant may be melamine, which can enhance flame retardancy and heat resistance at the same time.

The heat resistance improver may be alumina, silica, talc, clay, glass powder, glass fiber, metal powder, etc.

One or more fluorine-based water repellent may be used as the water repellent.

In addition, additives commonly used in the art may be selected depending on purposes.

In another aspect, the present invention provides a method for preparing a sound-absorbing material, including: a) immersing a nonwoven fabric containing 30-100 wt % of a heat-resistant fiber in a binder solution; and b) drying the nonwoven fabric.

Hereinafter, the steps of the method for preparing a sound-absorbing material according to the present invention will be described in detail.

In the step a), a nonwoven fabric formed of a heat-resistant fiber is immersed in a binder solution.

In the present invention, the nonwoven fabric is immersed in the binder solution so as to improve sound-absorbing and sound-insulating performance and to allow shaping of the sound-absorbing material to a desired shape. The binder solution includes, in addition to a binder resin, a curing agent, a catalyst, commonly used additives and a solvent.

The binder, curing agent, catalyst and commonly used additives included in the binder solution are the same ad described above. The solvent used to prepare the binder solution may be one or more selected from a ketone, a carbonate, an acetate, a cellosolve, etc. Specifically, the solvent may be one or more selected from acetone, methyl ethyl ketone (MEK), methyl isobutyl ketone (MIBK), dimethyl carbonate (DMC), ethyl acetate, butyl acetate, methyl cellosolve, ethyl cellosolve, butyl cellosolve, etc.

Specifically, the binder solution used in the present invention may contain 1-60 wt % of a binder and a solvent as the remainder. The binder solution used in the present invention may further contain a curing agent and other additives including a catalyst. In this case, the binder solution may contain 1-60 wt % of a binder, 0.1-10 wt % of a curing agent, 0.01-5 wt % of a catalyst, 1-40 wt % of additives and a solvent as the remainder. More specifically, the binder solution may contain 1-30 wt % of a binder, 0.1-10 wt % of a curing agent, 0.01-5 wt % of a catalyst, 1-30 wt % of a flame retardant as an additive and 40-95 wt % of a solvent.

The degree of impregnation into the nonwoven fabric may be controlled by controlling the concentration of the binder solution of the present invention. Specifically, the binder solution may be prepared to have a solid content of 1-60 wt %, more specifically 20-50 wt %. When the binder solution is too thin, the purpose of the present invention cannot be accomplished because the content of the binder impregnated into the nonwoven fabric is small. In contrast, when the binder solution is too thick, the nonwoven fabric may become hard and may not serve as a good sound-absorbing material.

When the content of the curing agent contained in the binder solution is too low, shaping to a desired shape may be difficult because complete curing of the binder cannot be expected. As a result, the effect of improving the mechanical strength of the sound-absorbing material may be unsatisfactory. And, if the content is too high, the sound-absorbing material may become hard and storage stability, etc. may be unsatisfactory. When the content of the catalyst is too low, the effect of facilitating reaction may be insignificant. In contrast, when the content of the catalyst is too high, stability, etc. may be unsatisfactory. The additives may be one or more additive(s) commonly used in the art, including a flame retardant, a heat resistance improver, a water repellent, etc. The content of these additives may be adjusted adequately depending on the purpose of addition. If the addition amount is too small, the desired effect may not be achieved. And, too large an addition amount may be economically unfavorable and may cause undesired side effects.

In the step b), the nonwoven fabric is dried.

The drying in the present invention is carried out by taking out the nonwoven fabric from the binder solution and removing the solvent. The drying may be carried out at appropriate temperatures under pressure. The drying may be carried out at 70-200° C., specifically 100-150° C. The drying in the present invention is a process whereby the content of the binder in the nonwoven fabric is controlled. With this, the physical properties of the sound-absorbing material can be controlled. The content of the binder included in the nonwoven fabric after the drying is an important factor determining the size, shape and distribution of vent holes inside the sound-absorbing material. Accordingly, the sound-absorbing property and mechanical property of the sound-absorbing material may be controlled therewith. In the present invention, the drying may be carried out such that the final content of the binder included in the nonwoven fabric is 1-300 parts by weight, more specifically 30-150 parts by weight, based on 100 parts by weight of the nonwoven fabric.

The method for preparing a sound-absorbing material according to the present invention may further include, after the step b), a step of preparing a sound-absorbing material by shaping the dried nonwoven fabric at high temperature (step c).

Specifically, if the step c) is included, the method for preparing a sound-absorbing material includes: a) immersing a nonwoven fabric containing 30-100 wt % of a heat-resistant fiber in a binder solution; b) drying the nonwoven fabric; and c) preparing a sound-absorbing material by shaping the dried nonwoven fabric at high temperature.

The step c) is a step where a sound-absorbing material is prepared by shaping the dried nonwoven fabric at high temperature. The shaping at high temperature considers also the curing of the thermosetting binder and is carried out at 150-300° C., more specifically 170-230° C.

The method for preparing a sound-absorbing material according to the present invention may further include, before the step a), a step of forming a nonwoven fabric by needle punching of a heat-resistant fiber (step a-1). For example, in the step a-1), an aramid nonwoven fabric having a thickness of 3-20 mm may be formed by needle punching of a heat-resistant aramid fiber of 1-15 denier.

If the step a-1) is further included, the method for preparing a sound-absorbing material may include: a-1) forming an aramid nonwoven fabric having a thickness of 3-20 mm by needle punching of a heat-resistant aramid fiber of 1-15 denier; a) immersing a nonwoven fabric containing 30-100 wt % of a heat-resistant fiber in a binder solution; and b) drying the nonwoven fabric.

Also, the method for preparing a sound-absorbing material including the step a-1) according to the present invention may include: a-1) forming an aramid nonwoven fabric having a thickness of 3-20 mm by needle punching of a heat-resistant aramid fiber of 1-15 denier; a) immersing a nonwoven fabric containing 30-100 wt % of a heat-resistant fiber in a binder solution; b) drying the nonwoven fabric; and c) preparing a sound-absorbing material by shaping the dried nonwoven fabric at high temperature.

The step a-1) of forming a nonwoven fabric includes needle punching of a heat-resistant fiber. The sound-absorbing property may vary depending on the thickness and density of the nonwoven fabric. It is expected that the sound-absorbing property will enhance with the increase of the thickness and density of the nonwoven fabric.

The nonwoven fabric used in the present invention may have a thickness of 3-20 mm when considering the application, etc., where the sound-absorbing material is used. When the thickness of the nonwoven fabric is smaller than 3 mm, the durability and shapeability of the sound-absorbing material may be unsatisfactory. In contrast, when the thickness exceeds 20 mm, productivity may decrease and production cost may increase. In addition, the density of the nonwoven fabric may be 100-2000 g/m$^2$, specifically 200-1200 g/m$^2$, more specifically 300-800 g/m$^2$, when considering performance and cost.

The aramid nonwoven fabric is formed by stacking a web of 30-100 g/m$^2$ formed by carding two 2- to 12-fold and continuously performing up-down preneedling, down-up needling and up-down needling, thereby forming physical bridges that provide the necessary thickness, binding strength and other desired physical properties. The needle used to perform the needling may be a barb-type needle, having a working blade of 0.5-3 mm and a needle length (the distance from crank outside to point) of 70-120 mm. Specifically, the needle stroke may be 30-350 times/m$^2$.

More specifically, the fineness of yarn for the nonwoven fabric may be 1.5-8.0 denier, the thickness of the pile layer may be 6-13 mm, the needle stroke may be 120-250 times/m$^2$, and the density of the nonwoven fabric may be 300-800 g/m$^2$.

The internal structure of the sound-absorbing material prepared by the method described above may be confirmed using an electron microscope. When observed with an electron microscope, the sound-absorbing material of the present invention has 1-100 μm-sized vent holes distributed inside thereof. The vent holes are distributed regularly or irregularly with a spacing of 0.1-500 μm.

In another aspect, the present invention provides a method for reducing noise of a noise-generating device, including: i) checking the three-dimensional shape of a noise-generating device; ii) preparing and shaping a sound-absorbing material so as to correspond to the three-dimensional shape of the device partially or wholly; and iii) bringing the sound-absorbing material adjacent to the noise-generating device.

The device refers to a noise-generating device including a motor, an engine, an exhaust system, etc. However, the scope of the device is never limited to the motor, engine and exhaust system. The sound-absorbing material may be prepared to correspond with the three-dimensional shape of the device partially or wholly. Since the sound-absorbing material of the present invention is shapeable during curing of the binder, the sound-absorbing material may be shaped to correspond with the three-dimensional shape of the device partially or wholly.

The expression "adjacent" means closely attaching the sound-absorbing material to the noise-generating device, providing it with a distance from the noise-generating device, or shaping it as a part of the noise-generating device. The expression adjacent also includes mounting the sound-absorbing material to a member connected to the noise-generating device (e.g., another sound-absorbing material).

Figure 2:
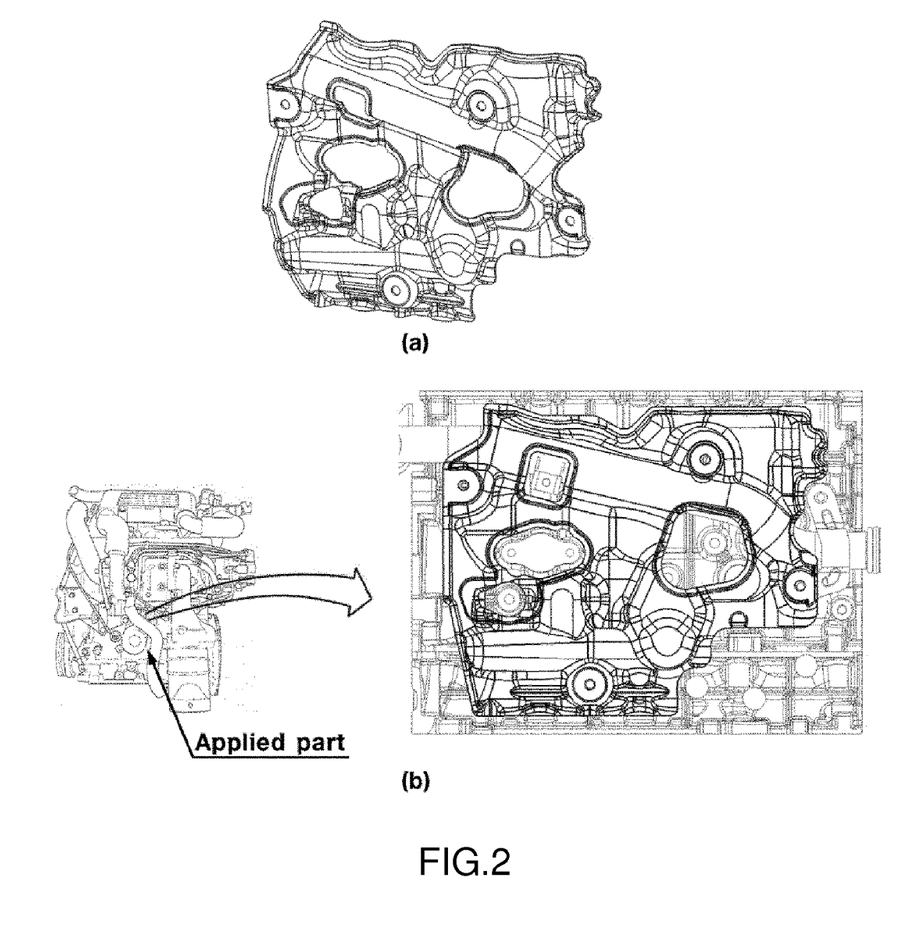
FIG. 2 schematically shows an example of a sound-absorbing material applied to a noise-generating device of an automobile after shaping as a part. (A) is an image of a sound-absorbing material shaped for use in an automobile engine, and (B) shows an example wherein a sound-absorbing material is applied in a part of an automobile engine.
Figure 3:
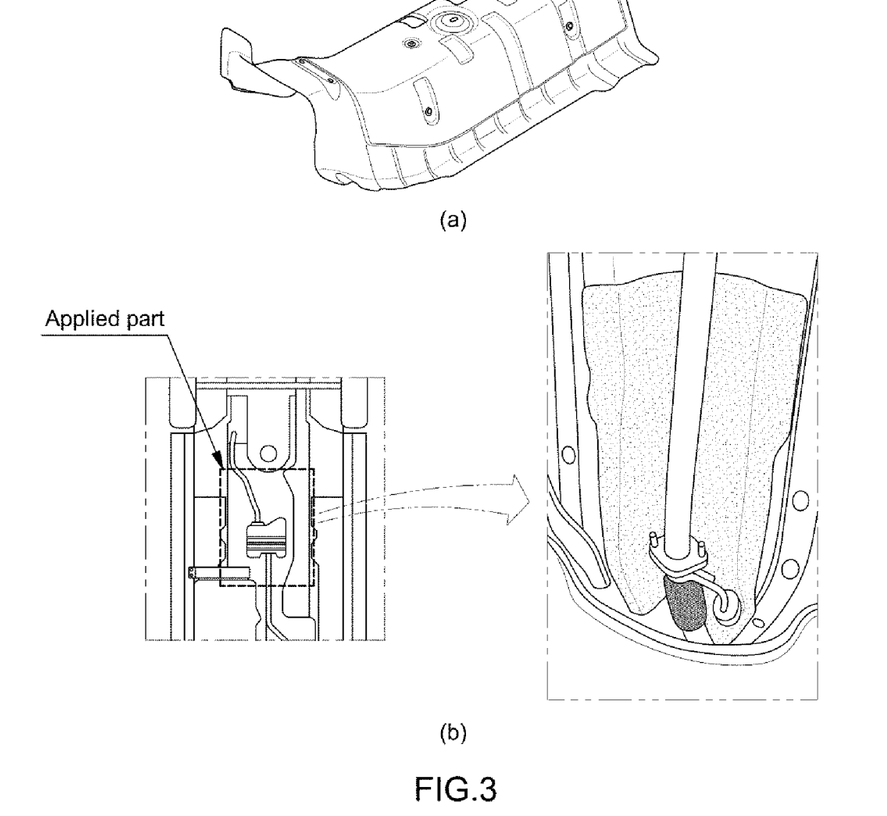
FIG. 3 schematically shows an example wherein a sound-absorbing material is applied to noise-generating device of an automobile with some distance. (A) is an image of a sound-absorbing material shaped for use in a lower part of an automobile, and (B) shows an example wherein a sound-absorbing material is attached to a lower part of an automobile.

FIG. 2 and FIG. 3 schematically show representative examples wherein the sound-absorbing material of the present invention is applied to a noise-generating device of an automobile.

FIG. 2 schematically shows an example wherein a sound-absorbing material is shaped as a part and applied to a noise-generating device of an automobile. (A) is an image of a sound-absorbing material shaped to be used in an automobile engine, and (B) shows an example wherein the sound-absorbing material is applied in a part of an automobile engine.

FIG. 3 schematically shows an example wherein a sound-absorbing material is applied to a noise-generating device of an automobile. (A) is an image of a sound-absorbing material shaped to be used in a lower part of an automobile, and (B) shows an example wherein the sound-absorbing material is attached to a lower part of an automobile.

As described above, the sound-absorbing material of the present invention, wherein the binder is impregnated to maintain the three-dimensional structure inside the nonwoven fabric, has superior sound-absorbing property, flame retardancy, heat resistance and heat-insulating property. Accordingly, it can exhibit the desired sound-absorbing performance when directly applied to a noise-generating device maintained at high temperatures of 200° C. or above, to say nothing of room temperature, without deformation.

The present invention will be described in more detail through examples. The scope of the present invention is not limited by the examples.

EXAMPLES

Preparation of Sound-Absorbing Material

Example 1

Preparation of Sound-Absorbing Material Using Epoxy Resin-Impregnated Aramid Nonwoven Fabric A m-aramid short fiber having a limiting oxygen index (LOI) of 40%, a heat resistance temperature of 300° C., a fineness of 2 denier and a length of 51 mm was air blown and formed into a web of 30 g/m$^2$ through carding. The web was stacked by overlapping 10-fold on a conveyor belt operated at 5 m/min using a horizontal wrapper. An aramid nonwoven fabric having a density of 300 g/m$^2$ and a thickness of 6 mm was prepared by continuously performing up-down needling, down-up needling and up-down needling with a needle stroke of 150 times/m$^2$.

The prepared nonwoven fabric was immersed in a binder solution with 1 dip 1 nip (pick-up 300%). The binder solution included 8 wt % of bisphenol A diglycidyl ether, 2 wt % of bisphenol A diglycidyl ether polymer, 0.2 wt % of dicyandiamide, 0.02 wt % of dimethylurea, 10 wt % of melamine cyanurate and 79.78 wt % of dimethyl carbonate (DMC).

The nonwoven fabric was taken from the binder solution and dried at 150° C. The dried nonwoven fabric contained 50 parts by weight of a binder based on 100 parts by weight of the nonwoven fabric.

The dried nonwoven fabric was shaped into a desired shape by curing at 200° C. for 2 minutes.

Comparative Example 1

Preparation of Sound-Absorbing Material Using Aramid Nonwoven Fabric

An aramid nonwoven fabric having a density of 300 g/m$^2$ and a thickness of 6 mm was prepared by needle punching as described in Example 1.

Comparative Example 2

Preparation of Sound-Absorbing Material Using Epoxy Resin-Coated Aramid Nonwoven Fabric An aramid nonwoven fabric having a density of 300 g/m$^2$ and a thickness of 6 mm was prepared by needle punching as described in Example 1. Subsequently, a coating solution was coated on the surface of the nonwoven fabric so that the content of a binder was 50 parts by weight based on 100 parts by weight of the nonwoven fabric. Then, the nonwoven fabric was shaped after drying at 150° C.

The coating solution included 8 wt % of bisphenol A diglycidyl ether, 2 wt % of bisphenol A diglycidyl ether polymer, 0.2 wt % of dicyandiamide, 0.02 wt % of dimethylurea, 10 wt % of melamine cyanurate and 79.78 wt % of dimethyl carbonate.

Comparative Example 3

Preparation of Sound-Absorbing Material Using Thermoplastic Resin-Impregnated Aramid Nonwoven Fabric An aramid nonwoven fabric having a density of 300 g/m$^2$ and a thickness of 6 mm was prepared by needle punching, immersed in a binder solution, dried and then shaped as described in Example 1.

The binder solution was a thermoplastic resin solution including 10 wt % of polyethylene resin, 10 wt % of melamine cyanurate and 80 wt % of dimethyl carbonate.

Comparative Example 4

Preparation of Sound-Absorbing Material Using Epoxy Resin-Impregnated PET Nonwoven Fabric A polyethylene terephthalate (PET) nonwoven fabric having a density of 300 g/m$^2$ and a thickness of 6 mm was prepared by needle punching, immersed in a binder solution, dried and then shaped as described in Example 1.

The PET nonwoven fabric prepared in Comparative Example 4 was thermally deformed due to the reaction heat produced during the curing of epoxy and could not be shaped to a desired shape because it was completely thermally deformed during the drying and shaping processes.

Test Example

Evaluation of Physical Properties of Sound-Absorbing Materials

The physical properties of the sound-absorbing materials were measured and compared as follows.

1. Evaluation of Heat Resistance

To evaluate heat resistance, the sound-absorbing material was aged in an oven at 260° C. for 300 hours. After keeping at standard state (temperature 23±2° C., 50±5% relative humidity) for at least 1 hour, appearance was inspected and tensile strength was measured. It was visually inspected whether there were shrinkage or deformation, surface peeling, fluffing and cracking. The tensile strength was measured using a dumbbell-type No. 1 for randomly selected five sheets of test samples at a speed of 200 mm/min under a standard condition.

2. Evaluation of Thermal Cycle

The durability of the sound-absorbing material was evaluated by the thermal cycle test method. The durability was determined after performing five cycles.

1) Condition of One Cycle

Room temperature→high temperature (150° C.×3 hr)→room temperature→low temperature (−30° C.×3 hr)→room temperature→humid condition (50° C.×95% RH)

2) Durability Evaluation Standard

After the thermal cycle test, the change in appearance was inspected. For example, surface damage, swelling, breaking and discoloring were inspected. If there was no change in appearance, the sound-absorbing material was evaluated as 'no abnormality'.

3. Evaluation of Flame Retardancy

The flame retardancy of the sound-absorbing material was measured according to the ISO 3795 flammability test.

4. Evaluation of Nonflammability

The nonflammability of the sound-absorbing material was measured according to the UL94 vertical burn test.

5. Evaluation of Sound-Absorbing Property

The sound-absorbing property of the sound-absorbing material was measured according to the ISO 354 method.

6. Evaluation of Air Permeability

1) Evaluation Method

The test sample was mounted on a Frazier-type tester and the amount of air flowing through the sample vertically was measured. The area of the test sample through which air passed was 5 cm$^2$ and the applied pressure was set to 125 pascal (Pa).

Test Example 1

Comparison of Properties of Sound-Absorbing Materials Depending on Heat-Resistant Fibers In Test Example 1, the physical properties of sound-absorbing materials prepared with different heat-resistant fiber yarns were compared. Nonwoven fabrics having a density of 300 g/m$^2$ and a thickness of 6 mm were prepared by needle punching and sound-absorbing materials were prepared by immersing in a binder solution, drying and then shaping as described in Example 1. The nonwoven fabrics were prepared using yarns having a fineness of 2 denier and a length of 51 mm, which are described in Table 1.

The physical properties of the sound-absorbing materials were measured as described above. The result of measuring the properties of the sound-absorbing materials prepared with different heat-resistant fibers is shown in Table 1 and Table 2.

TABLE 2-continued

| | Sound-absorbing rate | | | |
|---|---|---|---|---|
| Frequency (Hz) | Yarn 1 (aramid) | Yarn 2 (PPS) | Yarn 6 (oxi-PAN) | Yarn 7 (PK) |
| 1000 | 0.35 | 0.30 | 0.35 | 0.26 |
| 1250 | 0.44 | 0.39 | 0.45 | 0.37 |
| 1600 | 0.59 | 0.49 | 0.57 | 0.31 |
| 2000 | 0.70 | 0.66 | 0.68 | 0.48 |
| 2500 | 0.79 | 0.71 | 0.80 | 0.67 |
| 3150 | 0.83 | 0.80 | 0.85 | 0.78 |
| 4000 | 0.86 | 0.83 | 0.88 | 0.84 |
| 5000 | 0.99 | 0.95 | 0.92 | 0.83 |
| 6300 | 0.98 | 0.96 | 0.98 | 0.89 |
| 8000 | 0.99 | 0.95 | 0.89 | 0.95 |
| 10000 | 0.98 | 0.97 | 0.99 | 0.95 |

As seen from Table 1 and Table 2, all the sound-absorbing materials prepared using heat-resistant fibers having a limiting oxygen index of 25% or greater and a heat resistance temperature of 150° C. or higher as presented by the present invention exhibited satisfactory heat resistance, durability, flame retardancy, nonflammability and sound-absorbing property. Accordingly, it was confirmed that common heat-resistant fibers known as super fiber can be used as the material of the nonwoven fabric of the sound-absorbing material according to the present invention.

Test Example 2

Comparison of Properties of Sound-Absorbing Materials Depending Density of Nonwoven Fabric In Test Example 2, sound-absorbing materials were prepared in the same manner as in Example 1 using nonwoven

TABLE 1

| | | Yarn 1 | Yarn 2 | Yarn 3 | Yarn 4 | Yarn 5 | Yarn 6 | Yarn 7 |
|---|---|---|---|---|---|---|---|---|
| Yarn | Yarn material | Aramid | PPS | PI | PBI | PBO | Oxi-PAN | PK |
| | Limiting oxygen index | 40 | 30 | 50 | 40 | 60 | 65 | 30 |
| | Heat resistance temperature (° C. × 1 hr) | 300 | 230 | 300 | 300 | 300 | 300 | 300 |
| Heat resistance | Appearance | No abnormality | No abnormality | No abnormality | No abnormality | No abnormality | No abnormality | No abnormality |
| | Tensile strength (Kgf/cm$^2$) | 200 | 180 | 220 | 200 | 210 | 210 | 200 |
| Thermal cycle | Appearance | No abnormality | No abnormality | No abnormality | No abnormality | No abnormality | No abnormality | No abnormality |
| | Flame retardancy | Self-extinguishing | Self-extinguishing | Self-extinguishing | Self-extinguishing | Self-extinguishing | Self-extinguishing | Self-extinguishing |
| | Nonflammability | Nonflammable | Nonflammable | Nonflammable | Nonflammable | Nonflammable | Nonflammable | Nonflammable |

TABLE 2

| | Sound-absorbing rate | | | |
|---|---|---|---|---|
| Frequency (Hz) | Yarn 1 (aramid) | Yarn 2 (PPS) | Yarn 6 (oxi-PAN) | Yarn 7 (PK) |
| 400 | 0.08 | 0.05 | 0.08 | 0.05 |
| 500 | 0.10 | 0.06 | 0.09 | 0.06 |
| 630 | 0.16 | 0.09 | 0.13 | 0.08 |
| 800 | 0.23 | 0.15 | 0.22 | 0.19 | fabrics having different densities. The sound-absorbing performance of the prepared sound-absorbing materials is shown in FIG. 4.

Figure 4:
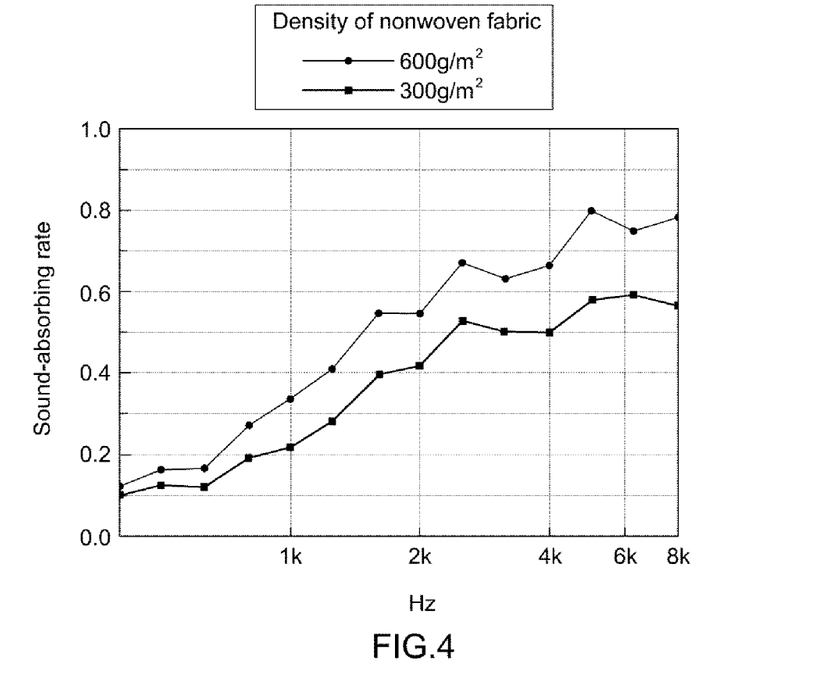
FIG. 4 is a graph comparing the sound-absorbing performance of a sound-absorbing material depending on the density of a nonwoven fabric.

As seen from FIG. 4, the sound-absorbing performance of the sound-absorbing material was superior when a nonwoven fabric having a density of 600 g/m$^2$ was used than when a nonwoven fabric having a density of 300 g/m$^2$ was used.

Test Example 3

Evaluation of Physical Properties of Sound-Absorbing Materials

In Test Example 3, the properties of sound-absorbing materials depending on the method by which a thermosetting binder was applied to a nonwoven fabric were compared.

That is to say, the sound-absorbing rate of the sound-absorbing materials prepared by impregnating (Example 1) and coating (Comparative Example 2) the thermosetting binder was compared. The result of measuring the sound-absorbing rate of the sound-absorbing material formed of a nonwoven fabric (Comparative Example 1), the sound-absorbing material on which the thermosetting binder was coated (Comparative Example 2) and sound-absorbing material wherein the thermosetting binder was impregnated into the nonwoven fabric (Example 1) is shown in Table 3.

TABLE 3

| | Sound-absorbing rate | | |
|---|---|---|---|
| Frequency (Hz) | Comparative Example 1 (nonwoven fabric) | Comparative Example 2 (binder-coated nonwoven fabric) | Example 1 (binder-impregnated nonwoven fabric) |
| 400 | 0.01 | 0.02 | 0.08 |
| 500 | 0.03 | 0.03 | 0.10 |
| 630 | 0.12 | 0.05 | 0.16 |
| 800 | 0.16 | 0.08 | 0.23 |
| 1000 | 0.26 | 0.12 | 0.35 |
| 1250 | 0.32 | 0.15 | 0.44 |
| 1600 | 0.39 | 0.22 | 0.59 |
| 2000 | 0.48 | 0.29 | 0.70 |
| 2500 | 0.64 | 0.40 | 0.79 |
| 3150 | 0.63 | 0.57 | 0.83 |
| 4000 | 0.72 | 0.68 | 0.86 |
| 5000 | 0.80 | 0.77 | 0.99 |
| 6300 | 0.78 | 0.82 | 0.98 |
| 8000 | 0.89 | 0.98 | 0.99 |
| 10000 | 0.90 | 0.98 | 0.98 |

As seen from Table 3, the sound-absorbing material of Example 1 according to the present invention showed superior sound-absorbing rate in all frequency ranges as compared to the sound-absorbing material of Comparative Example 1 wherein the nonwoven fabric not impregnated with a thermosetting binder was used. In contrast, the sound-absorbing material of Comparative Example 2 wherein the nonwoven fabric on which the thermosetting binder was coated was used showed lower sound-absorbing rate than the nonwoven fabric (Comparative Example 1) in the frequency range of 400-5000 Hz.

Test Example 4

Evaluation of Heat-Insulating Performance of Sound-Absorbing Materials

In Test Example 4, the heat-insulating performance of the sound-absorbing materials prepared in Example 1 (thermosetting resin-impregnated aramid nonwoven fabric), Comparative Example 1 (aramid nonwoven fabric) and Comparative Example 3 (thermoplastic resin-impregnated aramid nonwoven fabric) was evaluated. After applying heat of 1000° C. from one side of a 25-mm thick sample of each sound-absorbing material for 5 minutes, temperature was measured on the opposite side of the sample.

The temperature measured on the opposite side of the sound-absorbing material was 250° C. for Example 1 and 350° C. for Comparative Example 1. Accordingly, it was confirmed that the sound-absorbing material of the present invention wherein the thermosetting resin was improved exhibits improved heat-insulating performance. In contrast, the thermoplastic resin-impregnated sound-absorbing material of Comparative Example 3 was melt down as soon as the heat of 1000° C. was applied.

Accordingly, it can be seen that the sound-absorbing material of the present invention has very superior heat-insulating property.

Test Example 5

Comparison of Heat-Insulating Performance with Aluminum Heat-Insulating Plate In Test Example 5, the heat-insulating performance of the sound-absorbing material of Example 1 was compared with that of the aluminum heat-insulating plate. While applying the same heat from one side of the sound-absorbing material and the heat-insulating plate at 250° C., the temperature at the opposite side of the sound-absorbing materials was measured with time. The result is shown in FIG. 5.

Figure 5:
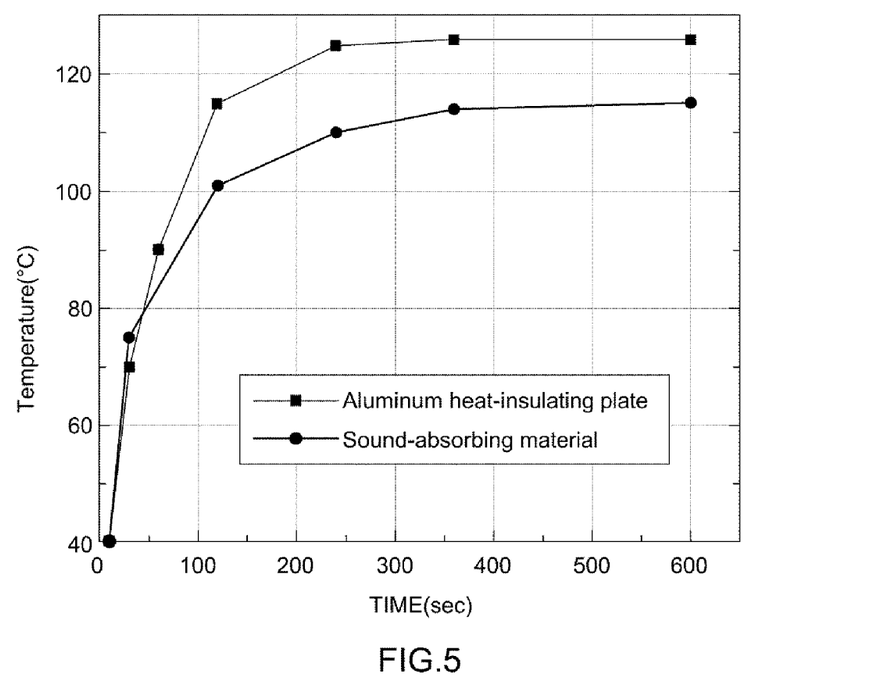
FIG. 5 is a graph comparing the heat-insulating performance of an aluminum heat-insulating plate with that of a sound-absorbing material of the present invention.

As seen from FIG. 5, the sound-absorbing material according to the present invention showed better heat-insulating performance with at least 11° C. lower as compared to the aluminum heat-insulating plate.

Test Example 6

Comparison of Properties of Sound-Absorbing Material Depending on Binder Content Sound-absorbing materials were prepared in the same manner as in Example 1. The epoxy resin-impregnated aramid nonwoven fabric was dried to have different final binder contents. The binder content was represented as parts by weight of the binder included in the sound-absorbing material based on 100 parts by weight of the dried nonwoven fabric.

The result of comparing the mechanical properties and sound-absorbing rate of the sound-absorbing materials prepared with different binder contents is shown in Table 4 and Table 5.

TABLE 4

| Physical properties of sound-absorbing materials with different binder contents | | | | | |
|---|---|---|---|---|---|
| Binder content (parts by weight) | 0 | 10 | 50 | 100 | 200 |
| Air permeability (mL/cm² · s) | 500 | 380 | 350 | 320 | 210 |
| Tensile strength (kg/cm²) | 40 | 60 | 200 | 240 | 310 |
| Nonflammability | Nonflammable | Nonflammable | Nonflammable | Nonflammable | Nonflammable |

TABLE 5

Sound-absorbing rate of sound-absorbing
materials with different binder contents

| Frequency (Hz) | 0 parts by weight | 10 parts by weight | 50 parts by weight | 100 parts by weight | 200 parts by weight |
|---|---|---|---|---|---|
| 400 | 0.01 | 0.01 | 0.08 | 0.06 | 0.02 |
| 500 | 0.03 | 0.04 | 0.10 | 0.09 | 0.04 |
| 630 | 0.12 | 0.14 | 0.16 | 0.15 | 0.09 |
| 800 | 0.16 | 0.17 | 0.23 | 0.25 | 0.11 |
| 1000 | 0.26 | 0.26 | 0.35 | 0.30 | 0.14 |
| 1250 | 0.32 | 0.34 | 0.44 | 0.42 | 0.17 |
| 1600 | 0.39 | 0.41 | 0.59 | 0.54 | 0.22 |
| 2000 | 0.48 | 0.55 | 0.70 | 0.58 | 0.35 |
| 2500 | 0.64 | 0.68 | 0.79 | 0.67 | 0.44 |
| 3150 | 0.63 | 0.69 | 0.83 | 0.72 | 0.52 |
| 4000 | 0.72 | 0.77 | 0.86 | 0.75 | 0.53 |
| 5000 | 0.80 | 0.83 | 0.99 | 0.79 | 0.57 |
| 6300 | 0.78 | 0.88 | 0.98 | 0.80 | 0.63 |
| 8000 | 0.89 | 0.91 | 0.99 | 0.90 | 0.70 |
| 10000 | 0.90 | 0.92 | 0.98 | 0.92 | 0.71 |

As seen from Table 4 and Table 5, the sound-absorbing rate was improved as the binder was impregnated into the nonwoven fabric when compared with the nonwoven fabric not impregnated with the binder. Also, it was confirmed that the sound-absorbing rate of the sound-absorbing material could be controlled with the binder content.

Test Example 7

Comparison of Properties of Sound-Absorbing Material Depending on Binders

Sound-absorbing materials wherein 50 parts by weight of a binder was impregnated based on 100 parts by weight of an aramid nonwoven fabric were prepared in the same manner as in Example 1. The resins described in Table 6 were used as the binder.

The result of comparing the mechanical properties and sound-absorbing rate of the sound-absorbing materials prepared with different binders is shown in Table 6.

TABLE 6

Sound-absorbing rate of sound-absorbing
materials with different binders

| Binder resin | Epoxy | Phenol | Urea | Melamine | Polyurethane |
|---|---|---|---|---|---|
| Heat resistance temperature (° C. × 1 hr) | 300 | 260 | 190 | 300 | 200 |
| Tensile strength (kg/cm²) | 200 | 165 | 180 | 180 | 170 |
| Flame retardancy | Self-extinguishing | Self-extinguishing | Self-extinguishing | Self-extinguishing | Self-extinguishing |
| Nonflammability | Non-flammable | Non-flammable | Non-flammable | Non-flammable | Non-flammable |

The invention claimed is:

1. A sound-absorbing material comprising:
   a nonwoven fabric comprising an amount of 30 wt % to 100 wt % of a heat-resistant fiber; and
   a binder impregnated in the same layer as the nonwoven fabric and maintaining a three-dimensional structure inside the nonwoven fabric,
   wherein the binder is distributed and attached to the surface of the fiber yarn of the nonwoven fabric, thereby maintaining the structure of or facilitating the formation of micro-cavities of the nonwoven fabric.

2. The sound-absorbing material according to claim 1, wherein the heat-resistant fiber has a limiting oxygen index (LOI) of 25% or greater and a heat resistance temperature in a range of 150° C. or greater.

3. The sound-absorbing material according to claim 2, wherein the heat-resistant fiber is one or more selected from the group consisting of aramid fiber, polyphenylene sulfide (PPS) fiber, oxidized polyacrylonitrile (oxi-PAN) fiber, polyimide (PI) fiber, polybenzimidazole (PBI) fiber, polybenzoxazole (PBO) fiber, polytetrafluoroethylene (PTFE) fiber, polyketone (PK) fiber, metallic fiber, carbon fiber, glass fiber, basalt fiber, silica fiber and ceramic fiber.

4. The sound-absorbing material according to claim 3, wherein the heat-resistant fiber is an aramid fiber.

5. The sound-absorbing material according to claim 1, wherein the nonwoven fabric is a single-layer nonwoven fabric formed of an aramid fiber having a fineness in a range of 1 denier to 15 denier and having a thickness in a range of 3 mm to 20 mm.

6. The sound-absorbing material according to claim 1, wherein the nonwoven fabric has a density in a range of 100 g/m² to 2000 g/m².

7. The sound-absorbing material according to claim 5, wherein the nonwoven fabric has a density in a range of 200 g/m² to 1200 g/m².

8. The sound-absorbing material according to claim 1, wherein the binder is a thermosetting resin.

9. The sound-absorbing material according to claim 8, wherein the thermosetting resin is an epoxy resin.

10. The sound-absorbing material according to claim 9, wherein the epoxy resin is one or more selected from the group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, bisphenol A diglycidyl ether polymer, phosphazene diglycidyl ether, bisphenol A novolac epoxy, phenol novolac epoxy resin and o-cresol novolac epoxy resin.

11. The sound-absorbing material according to claim 1, wherein the sound-absorbing material is shaped to have a three-dimensional shape to which the sound-absorbing material is applied.

12. The sound-absorbing material according to claim 1, wherein the sound-absorbing material is formed in a single layer or multiple layers.

13. The sound-absorbing material according to any one of claims 1 to 12, wherein the sound-absorbing material is used in a vehicle.

14. A method for preparing a sound-absorbing material according to claim 1, comprising:
   a) immersing a nonwoven fabric comprising an amount of 30 wt % to 100 wt % of a heat-resistant fiber in a binder solution; and
   b) drying the immersed nonwoven fabric,
   wherein the binder is distributed and attached to the surface of the fiber yarn of the nonwoven fabric, thereby maintaining the structure of or facilitating the formation of micro-cavities of the nonwoven fabric.

15. The method for preparing the sound-absorbing material according to claim 14, which further comprises, after said drying the immersed nonwoven fabric, preparing the sound-absorbing material by shaping the dried nonwoven fabric at elevated temperature.

16. The method for preparing the sound-absorbing material according to claim 14, wherein the heat-resistant fiber has a limiting oxygen index (LOI) of 25% or greater and a heat resistance temperature of 150° C. or greater.

17. The method for preparing the sound-absorbing material according to claim 16, wherein the heat-resistant fiber is one or more selected from the group consisting of aramid fiber, polyphenylene sulfide (PPS) fiber, oxidized polyacrylonitrile (oxi-PAN) fiber, polyimide (PI) fiber, polybenzimidazole (PBI) fiber, polybenzoxazole (PBO) fiber, polytetrafluoroethylene (PTFE) fiber, polyketone (PK) fiber, metallic fiber, carbon fiber, glass fiber, basalt fiber, silica fiber and ceramic fiber.

18. The method for preparing the sound-absorbing material according to claim 14, wherein the heat-resistant fiber is an aramid fiber having a fineness in a range of 1 denier to 15 denier having a yarn length in a range of 20 mm to 100 mm.

19. The method for preparing the sound-absorbing material according to claim 14, wherein the nonwoven fabric has a thickness in a range of 3 mm to 20 mm and a density in a range of 100 g/m$^2$ to 2000 g/m$^2$.

20. The method for preparing the sound-absorbing material according to claim 15, which further comprises, before said immersing the nonwoven fabric, forming an aramid nonwoven fabric having a thickness in a range of 3 mm to 20 mm by needle punching of a heat-resistant aramid fiber having a fineness in a range of 1 denier to 15 denier.

21. The method for preparing the sound-absorbing material according to claim 20, wherein the nonwoven fabric is formed by continuously performing up-down needling, down-up needling and up-down needling.

22. The method for preparing the sound-absorbing material according to claim 20, wherein the nonwoven fabric is formed with a needle stroke in a range of 30 times/m$^2$ to 350 times/m$^2$.

23. The method for preparing the sound-absorbing material according to claim 14, wherein the binder solution comprises an amount of 1 wt % to 60 wt % of a binder, an amount of 0.1 wt % to 10 wt % of a curing agent, an amount of 0.01 wt % to 5 wt % of a catalyst, an amount of 1 wt % to 40 wt % of an additive and a solvent as the remainder, based on the total weight of the binder solution.

24. The method for preparing the sound-absorbing material according to claim 23, wherein the binder solution comprises an amount of 1 wt % to 30 wt % of a binder, an amount of 0.1 wt % to 10 wt % of a curing agent, an amount of 0.01 to 5 wt % of a catalyst, an amount of 1 wt % to 30 wt % of a flame retardant and an amount of 40 wt % to 95 wt % of a solvent, based on the total of the binder solution.

25. The method for preparing the sound-absorbing material according to claim 14, wherein the binder is a thermosetting resin.

26. The method for preparing the sound-absorbing material according to claim 25, wherein the thermosetting resin is an epoxy resin.

27. The method for preparing the sound-absorbing material according to claim 26, wherein the epoxy resin is one or more selected from the group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, bisphenol A diglycidyl ether polymer, phosphazene diglycidyl ether, bisphenol A novolac epoxy, phenol novolac epoxy resin and o-cresol novolac epoxy resin.

28. The method for preparing a sound-absorbing material according to claim 14, wherein the drying is performed at a temperature in a range of 70° C. to 200° C. and the dried nonwoven fabric comprises an amount of 1 part to 300 parts by weight of a binder based on 100 parts by weight of the nonwoven fabric.

29. The method for preparing the sound-absorbing material according to claim 14, wherein the sound-absorbing material is for an automobile.

30. A method for reducing noise of a noise-generating device, comprising:
   i) checking a three-dimensional shape of the noise-generating device;
   ii) preparing and shaping a sound-absorbing material of according to claim 1 so as to correspond to the three-dimensional shape of the device partially or entirely; and
   iii) bringing the sound-absorbing material adjacent to the noise-generating device.

31. The method for reducing noise of the noise-generating device according to claim 30, wherein the device is a motor, an engine or an exhaust system.

32. The method for reducing noise of the noise-generating device according to claim 30, wherein the sound-absorbing material is brought adjacent to the noise-generating device by attaching the sound-absorbing material to the noise-generating device, providing the sound-absorbing material with a distance from the noise-generating device, or shaping the sound-absorbing material as a part of the noise-generating device.

* * * * *